P. Hoffner,
Screw-Cutting Die,
Nº 22,918. Patented Feb. 8, 1859.
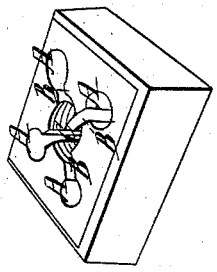
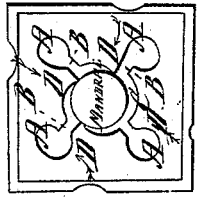
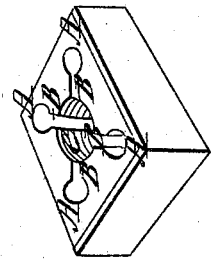
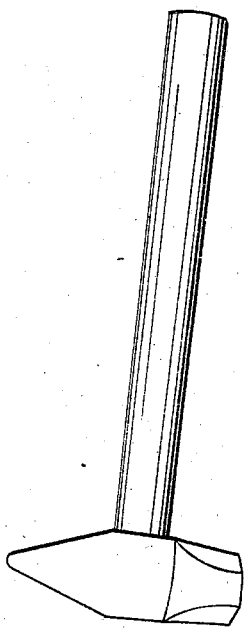
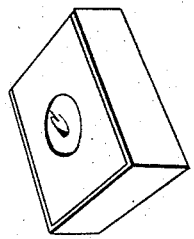
Inventor
Peter Hoffner

UNITED STATES PATENT OFFICE.

P. HOFFNER, OF RISING SUN, INDIANA, ASSIGNOR TO HIMSELF, AND SAMUEL F. COVINGTON, OF INDIANAPOLIS, INDIANA.

DIE FOR CUTTING SCREWS.

Specification of Letters Patent No. 22,918, dated February 8, 1859.

*To all whom it may concern:*

Be it known that I, PETER HOFFNER, of Rising Sun, in the county of Ohio and State of Indiana, have invented a new and useful Improvement in Dies for Cutting Screws; and I do hereby declare that the following is a full and exact description, reference being had to the accompanying drawings and the letters of reference marked thereon.

Figures 1, 2, 3, represent the die at different stages in its construction. Fig. 4 exhibits the same when completed. Fig. 1 represents a blank which must be provided with an aperture less than the bolt to be threaded according to the depth of thread required. Fig. 2 represents the same when the screw tap has been applied and the thread cut. Fig. 3 represents the same when the chip holes are bored and a passage opened from the eye to the same—also the mandrel placed in the eye and the cutting edge of the thread brought down to the taker mandrel at the place required. Fig. 4 represents the completed die.

The following is the manner of construction. To make a die which will thread a half-inch bolt I provide a blank as shown in Fig. 1, whose aperture is about three-eighths or seven-sixteenths of an inch—acording to the depth of thread required—and open it with a screw tap until the small side of the aperture is nine-sixteenths of an inch. I then bore four chip holes A, A, A, A, and with a hack saw open passages B, B, B, B, from the eye C, to the chip holes A, A, A, A, which is represented by Fig. 2. I then bring the die to a low red-heat, and place in the eye a taper mandrel, with a circle marked at a place, where the mandrel is the required size. I then take the peen of a hammer and dent or peen the die over the cutting edge of the thread, until the point touches the mandrel as shown at D, D, D, D. I then very carefully tap the eye sufficiently to take off any wire edge or slight irregularities caused be peening. The die is then finished with the exception of annealing, fitting to the socket and tempering.

The advantages of this die over other solid dies may be seen in the fact that when the lead or salience is imparted to it by filing the rear portion of the cutting thread, the bottom of the groove remains the same, and must rub the thread of the screw, thereby increasing the friction, or causing friction after the screw is cut; and that the die when too much worn may be again peened or shrunk and tapered without increasing the size or diminishing the efficiency of the same. A further advantage may be seen in the fact that the taper of the eye may be such that while the first point takes out but a small chip, the 2d, 3d, and 4th, &c., does each its share of cutting. When the taper is given to the ordinarily constructed solid die the rear part of the thread or groove, has approached the center thereby increasing the friction in proportion to the tape of the eye.

What I claim and desire to secure by Letters Patent, is—

The construction of a solid die as above, in which the bottom of the groove is so thrown up in the rear of the cutting point or edge of the same, as to avoid the friction occasioned by the rubbing upon the top of the thread of the bolt cut or threaded.

PETER HOFFNER.

Witnesses:
   H. W. ELLSWORTH,
   JOHN H. REDSTONE.